United States Patent
Kempf et al.

(10) Patent No.: US 10,970,336 B2
(45) Date of Patent: Apr. 6, 2021

(54) PREDICTING ENTITIES FOR SEARCH QUERY RESULTS

(71) Applicant: salesforce.com, inc., San Francisco, CA (US)

(72) Inventors: Guillaume Jean Mathieu Kempf, San Francisco, CA (US); Marc Brette, Montbonnot (FR)

(73) Assignee: salesforce.com, inc., San Francisco, CA (US)

( * ) Notice: Subject to any disclaimer, the term of this patent is extended or adjusted under 35 U.S.C. 154(b) by 262 days.

(21) Appl. No.: 16/049,559

(22) Filed: Jul. 30, 2018

(65) Prior Publication Data

US 2020/0034493 A1   Jan. 30, 2020

(51) Int. Cl.
  *G06F 16/903* (2019.01)
  *G06N 3/02* (2006.01)

(52) U.S. Cl.
  CPC ......... *G06F 16/90335* (2019.01); *G06N 3/02* (2013.01)

(58) Field of Classification Search
  CPC ........... G06F 16/24578; G06F 16/2425; G06F 16/9535; G06F 21/6218; G06F 11/3604
  See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 2012/0137091 A1* | 5/2012 | Grube | G06F 12/0638 711/158 |
| 2016/0179906 A1 | 6/2016 | Roustant | |
| 2017/0262544 A1 | 9/2017 | Brette et al. | |
| 2018/0293241 A1 | 10/2018 | Chittar et al. | |
| 2019/0005089 A1 | 1/2019 | Kemf et al. | |
| 2019/0108228 A1* | 4/2019 | Zeng | G06N 3/0454 |
| 2019/0130013 A1 | 5/2019 | Kempf | |
| 2019/0197152 A1 | 6/2019 | Kempf | |

OTHER PUBLICATIONS

Bradbury et al., "Quasi-Recurrent Neural Networks," Under review as a conference paper at ICLR 2017 Cornell University Library, Under review as a conference paper at ICLR 2017, arXiv:1611.01576v1, submitted Nov. 5, 2016.

Han et al., "Deep Pyramidal Residual Networks," arXiv:1610.02915, submitted Oct. 10, 2016.

(Continued)

*Primary Examiner* — Truong V Vo
(74) *Attorney, Agent, or Firm* — Haynes and Boone, LLP

(57) ABSTRACT

For a database accessible by a plurality of separate organizations, a system is provided for predicting entities for database query results. The system includes a multi-layer neural network. The system is configured to receive a query encoding for one or more previous queries made into the database, a user entity view frequency encoding for a frequency of views by one or more users, and an organization encoding for one or more separate organizations accessing the database; and based on the query encoding, the user entity view frequency encoding, and the organization encoding, generate a neural model for predicting entities for results to a present query into the database. In some embodiments, the neural model is global across the separate organizations accessing the database.

24 Claims, 10 Drawing Sheets

(56) References Cited

OTHER PUBLICATIONS

He et al., "Deep Residual Learning for Image Recognition," arXiv:1512.03385, submitted Dec. 10, 2015.
Hu et al., "Squeeze-and-Excitation Networks," arXiv:1709.01507, submitted on Sep. 5, 2017.
Iandola et al., "Densenet: Implementing Efficient Covnet Descriptor Pyramids," arXiv:1404.1869, submitted on Apr. 7, 2014.

* cited by examiner

| index | character | nb_searches |
|---|---|---|
| 1 | o | 42562185 |
| 2 | a | 36585914 |
| ... | ... | ... |
| 10000 | ≋ | 10 |

| index | character | nb_searches |
|---|---|---|
| 1 | o | 42562185 |
| 2 | a | 36585914 |
| ... | ... | ... |
| 25469 | ≋ | 1 |

FIG. 7

| index | word | nb_searches |
|---|---|---|
| 1 | com | 1726621 |
| 2 | gmail | 1598619 |
| ... | | |
| 20000 | castorama | 315 |

| index | word | nb_searches |
|---|---|---|
| 1 | com | 1726621 |
| 2 | gmail | 1598619 |
| ... | | |
| 3923076 | basilik | 1 |

FIG. 8

| index | key_prefix | nb_searches |
|---|---|---|
| 1 | 001 | 57030720 |
| 2 | 005 | 503364749 |
| ... | ... | ... |
| 1244 | m80 | 200 |

| index | key_prefix | nb_searches |
|---|---|---|
| 1 | 001 | 57030720 |
| 2 | 005 | 503364749 |
| ... | ... | ... |
| 1672 | aPZ | 1 |

| index | organization_id | nb_searches |
|---|---|---|
| 1 | orgIdRAA | 1726621 |
| 2 | orgIdKRD | 1598619 |
| ... | ... | ... |
| 6000 | orgIdJAE | 1017 |

| index | organization_id | nb_searches |
|---|---|---|
| 1 | orgIdRAA | 1726621 |
| 2 | orgIdKRD | 1598619 |
| ... | ... | ... |
| 150000 | orgIdJAE | 1 |

PREDICTING ENTITIES FOR SEARCH QUERY RESULTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to a system and method for predicting entities for search query results.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store data or information. In a customer relationship management (CRM) database, for example, this data or information can include records for business accounts, business leads, contacts for the business accounts and leads, a contact's given name, family name, job title, employer name, street address, city, state, zip code, e-mail address, telephone number, etc. This data and information in a database system can be stored in the form of electronic records or digital objects. When a user is interested in accessing data or information stored by database system but the user does not know the specific object that includes the data/information or the storage location of the object, the user typically submits a search query to the database system, for example, using a search bar or similar user interface tool. The database system responds with a query result for one or more electronic records or objects that are potentially relevant to the user's query. However, for a database system with many records/objects, this process of identifying objects related to a search query consumes a large amount of system resources (e.g., hardware resources). Additionally, processing such a query will take a long period of time and cause the user to have a negative experience with the online system. Moreover, the search results can contain not only the information or data of interest to the user, but also many "false" hits. As such, the most relevant information or records may be buried or obscured in the returned search results, which further contributes to the user having a negative experience with the database system.

BRIEF DESCRIPTION OF THE DRAWINGS

FIG. 7 is a simplified diagram illustrating the mapping of a dataset for character encoding according to some embodiments.

FIG. 8 is a simplified diagram illustrating the mapping of a dataset for word encoding according to some embodiments.

FIG. 9 is a simplified diagram illustrating the mapping of a dataset for frequency view encoding according to some embodiments.

FIG. 10 is a simplified diagram illustrating the mapping of a dataset for organization encoding according to some embodiments.

Figure 1:
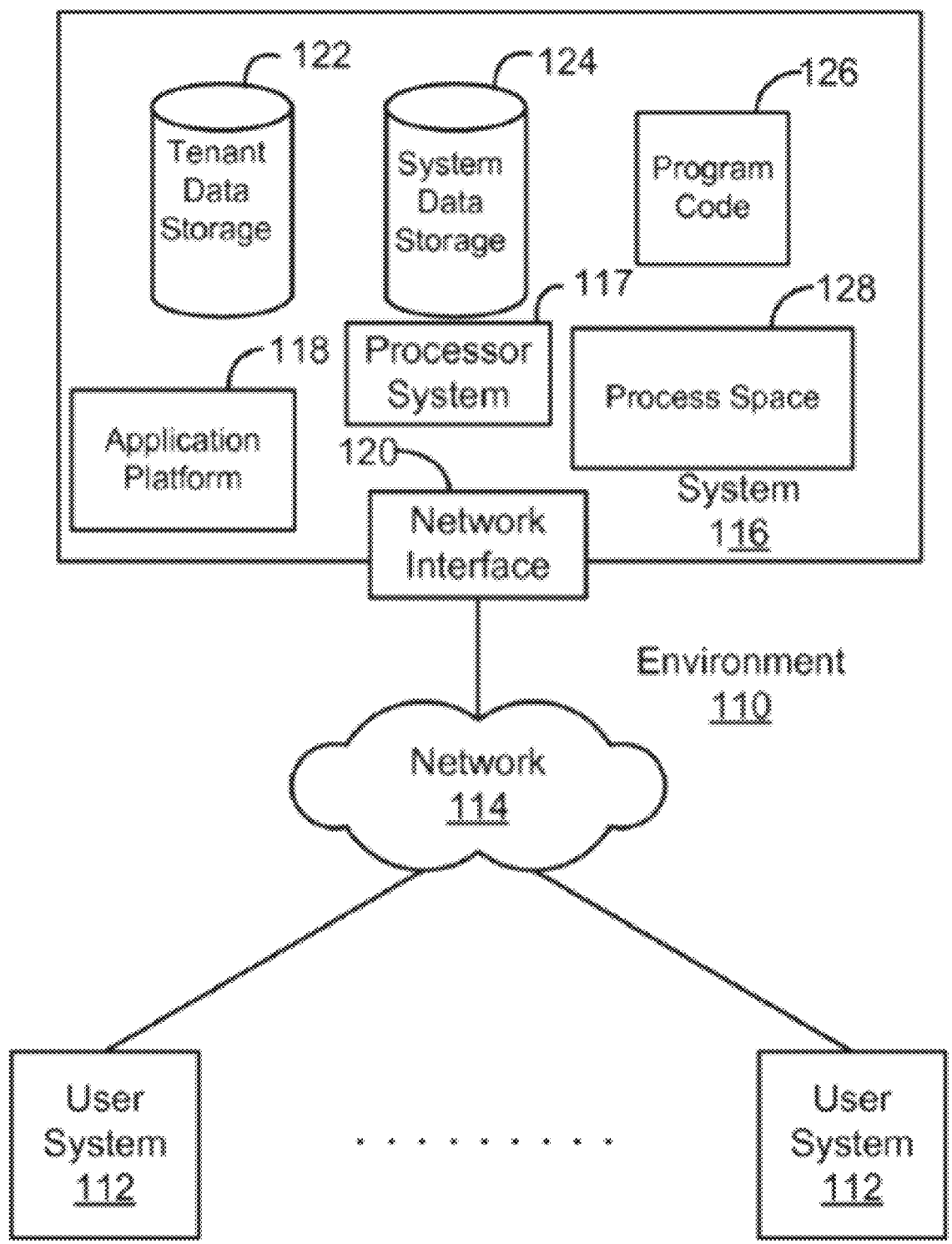
FIG. 1 illustrates a block diagram of an example environment wherein systems and methods for predicting entities for database query results may be used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a database system accessible by a plurality of separate organizations, such as a multi-tenant database system, methods, data structures, and systems are provided for predicting entities for results to a query into the database system. The database system stores multiple objects that are accessible by users of the database system. The objects may be generated, for example, by users or administrators of the database systems. Objects stored by the database system are associated with entity types. An entity type associated with an object describes a characteristic of the object, a category or a segment to which the object has been assigned. As an example, a database system for customer relationship management (CRM) may store objects associated with an account entity type because each object represents a sales account, objects associated with a contact entity type because each object represents contact information for a person, objects associated with a lead entity type because each object represents a lead for a potential customer.

The embodiments described herein provide methods, computer program products, and computer database systems for predicting an entity type of an object searched for by a user using machine learning techniques. An online system provides users with access to online services. For example, the online system may be a web-based CRM system that provides employees of an enterprise with access to CRM software applications. As part of providing the services to users, the online system stores multiple objects that are accessible by users of the online system. The objects may be generated, for example, by users or administrators of the online system.

According to some embodiments, in a multi-tenant database system accessible by a plurality of separate and distinct organizations, a neural network model is provided for predicting the entities (e.g., account, contact, lead, case, etc.) in which results are returned that are most relevant for a given search query into the database, taking into account the specificities of each organization, thereby enhancing the experience of users associated with the organization.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
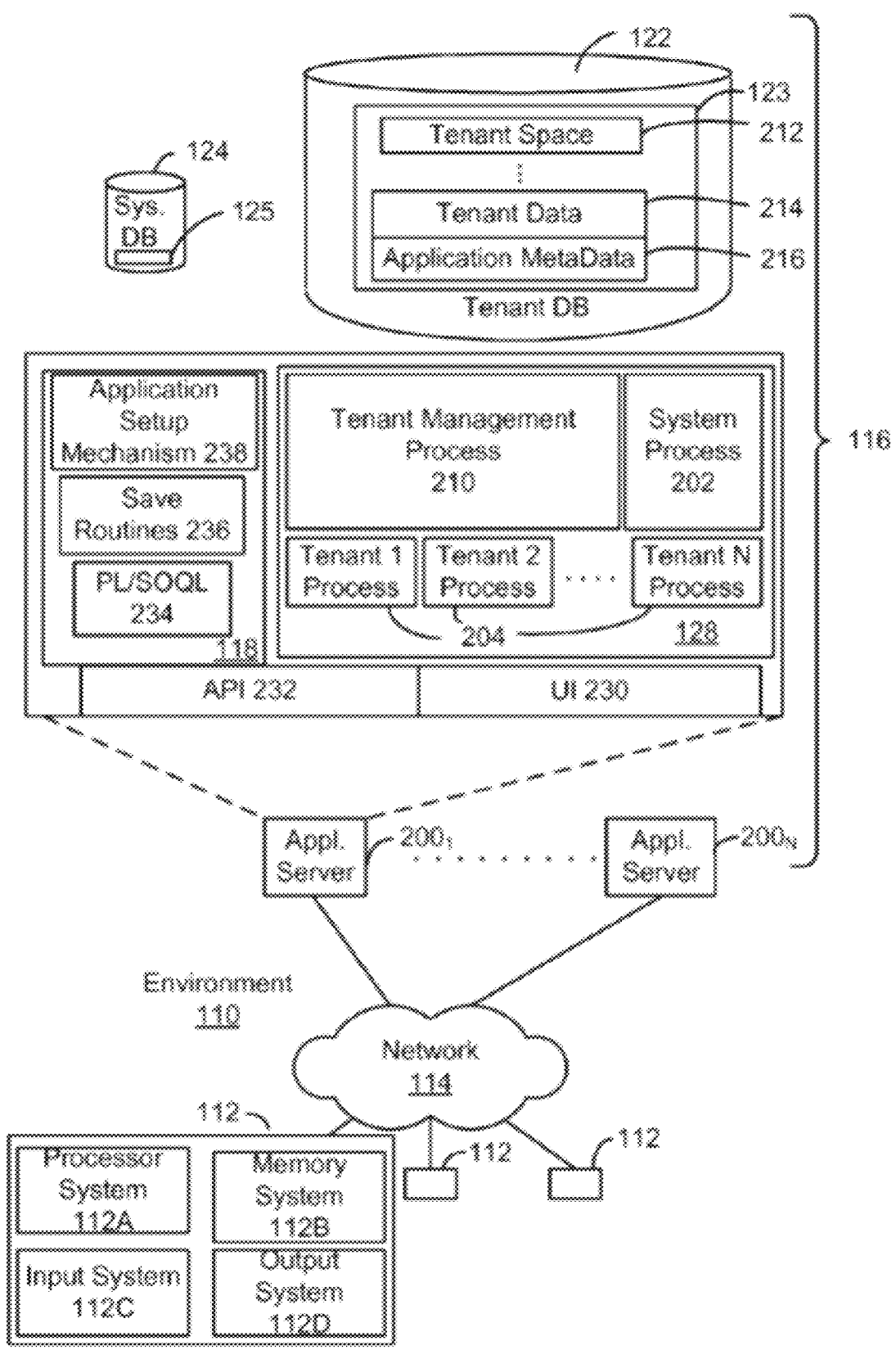
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users"), regarding an inquiry, problem, question, issue, support-related matter, etc. To facilitate interaction between the database system 116 and the user, a search bar or similar user interface tool is provided. The search tool allows a user to query the database to access information or data concerning or relating to various objects or entities relevant to the user.

For large databases with many records and information, however, there may be terms (e.g., common names like "Johnson") that appear in multiple records over multiple entities. For example, the term "Johnson" may appear in 1 of 100 records in the account entity, 5 of 1,000 records in the contact entity, and 12 of 2,000 records in the lead entity. Thus, a database system's search index data may not be an accurate basis to predict for which entity a user intends to search when the user submits a query. Furthermore, a database system may require a relatively large amount of time and system resources to request and then receive search index data from search servers. It is a difficult task to predict and order entities (e.g., account, contact, lead, group, etc.) searched by the users. In a multi-tenant system, such as Salesforce.com, each organization or user has a different click distribution and can be interacting with the entities in a different way. Continuing with the example, because the user may be most interested in one of the "Johnson" records in the contact entity, for optimal or enhanced user experience, it may be desirable or preferable that the database system predict the entity that is most relevant or applicable to a user's search or query so that the desired information or data is presented to the user in the fewest number of keystrokes or mouse clicks, etc. As such, according to some embodiments, systems and methods are provided for predicting entities for database query results.

Neural Model

According to some embodiments, in a multi-tenant database system accessible by a plurality of separate and distinct organizations, such as system 116 shown and described with respect to FIGS. 1 and 2, a neural network model is provided for predicting the entities (e.g., account, contact, lead, case, etc.) in which results are returned that are most relevant for a given search query into the database, taking into account the specificities of each organization, thereby enhancing the experience of users associated with the organization.

Figure 3:
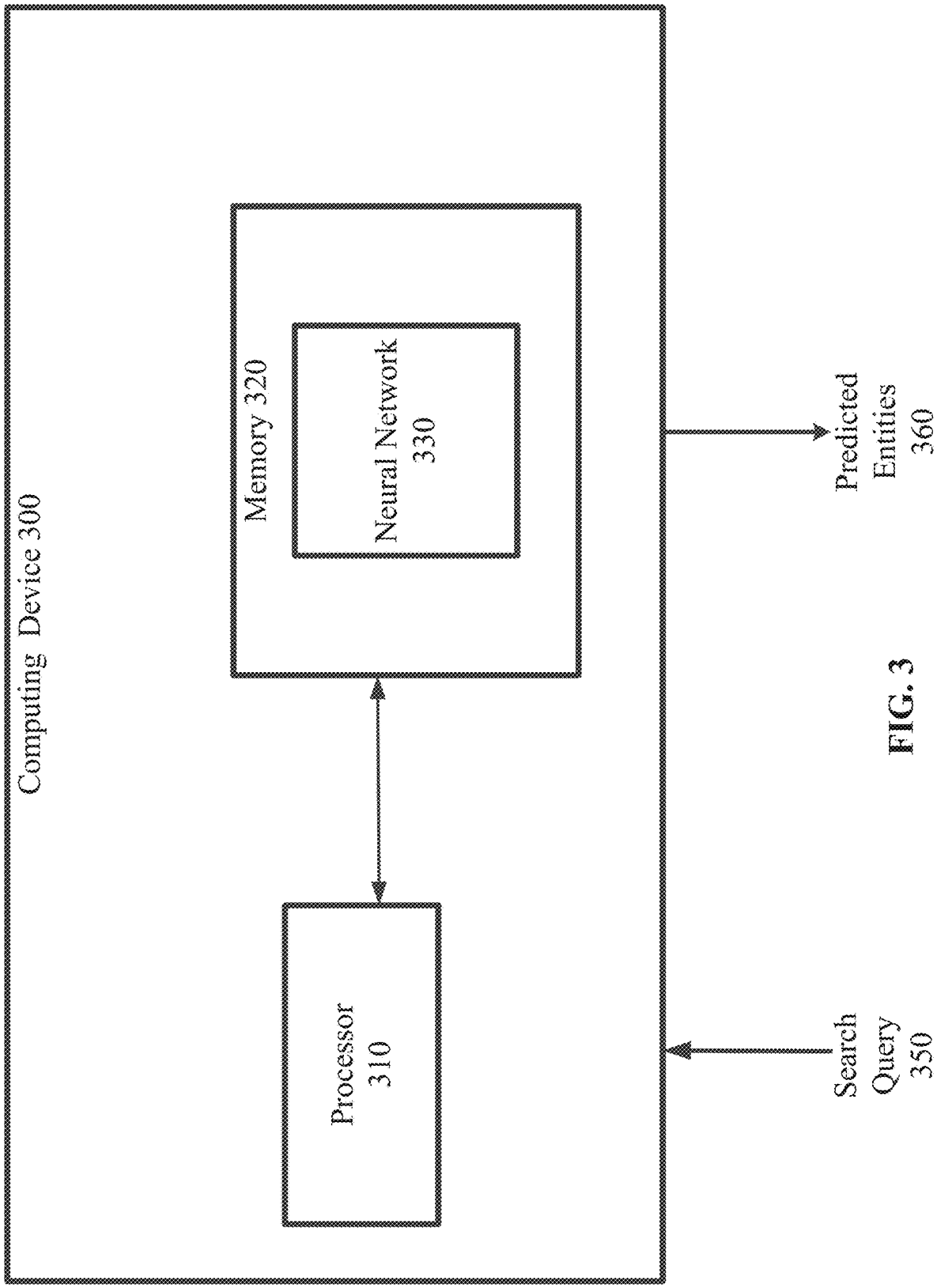
FIG. 3 is a simplified diagram of a computing device according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a neural network 330. Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Neural network 330 may be used to implement and/or emulate any of the neural networks described further herein. In some examples, neural network 330 may include a multi-layer or deep neural network. According to some embodiments, the neural network 330 may be trained with one or more encodings or features so that it is able to predict the entities (e.g., account, contact, lead, case, etc.) in which results are returned that are most relevant for a given search query into the database system. This is described in more detail below.

After training of the neural network 330, in some embodiments, the neural model implemented by network 330 is global for the multi-tenant database system, such as system 116, and applied to or used for all organizations or tenants whose users make queries into the database. Computing device 300 may receive or intake a search query 350 (e.g., "Johnson") from a user of an organization or tenant accessing the database system. The computing device 300, using the model of neural network 330, generates predicted entities 360 for which results are returned that are most relevant for the search query 350 into the database, taking into account the specificities of the organization of the user. Thus, for example, for a user belonging to a first organization (Org 1), the computing device 300 may predict that the entities account and contact are most relevant for the user's query, and thus provides or support the provision of search results for, e.g., "Johnson," from those entities. However, for another user belonging to a second organization (Org 2), the computing device 300 may predict that the entities lead and contact are most relevant, and thus provides or support the provision of search results for, e.g., "Johnson," from that different set of entities.

According to some embodiments, the functionality of the computing device 300, including neural network 330, may be implemented or incorporated in a Search Model Service (SMS) plugin. SMS is a gRPC microservice that hosts and executes machine learning models. SMS takes in parameters via a Protobuf file, and executes models using those input parameters. SMS returns a response back to the client (e.g., user device) according to the response parameters defined. In some embodiments, the SMS implementation runs on an environment for containerized applications (e.g., Salesforce Application Model (SAM)) that is separate or independent from the core applications of the multi-tenant database system, such as system 116. SMS may provide for faster deployment of the model. SMS also provides for isolation/containerization of Java virtual machines (JVMs), so that a crash related to its model execution will not impact or affect the application servers of the database system. The SMS plugin is isolated code that can initialize the model data for a particular model type, perform model-specific feature processing, and execute model based on feature vectors and other parameters. The plugin architecture provides various advantages, including that changes can be made to plugin code without making changes to model executor code, and that concerns about load balancing, routing, and parallelizing are reduced or eliminated with plugins.

Figure 4:
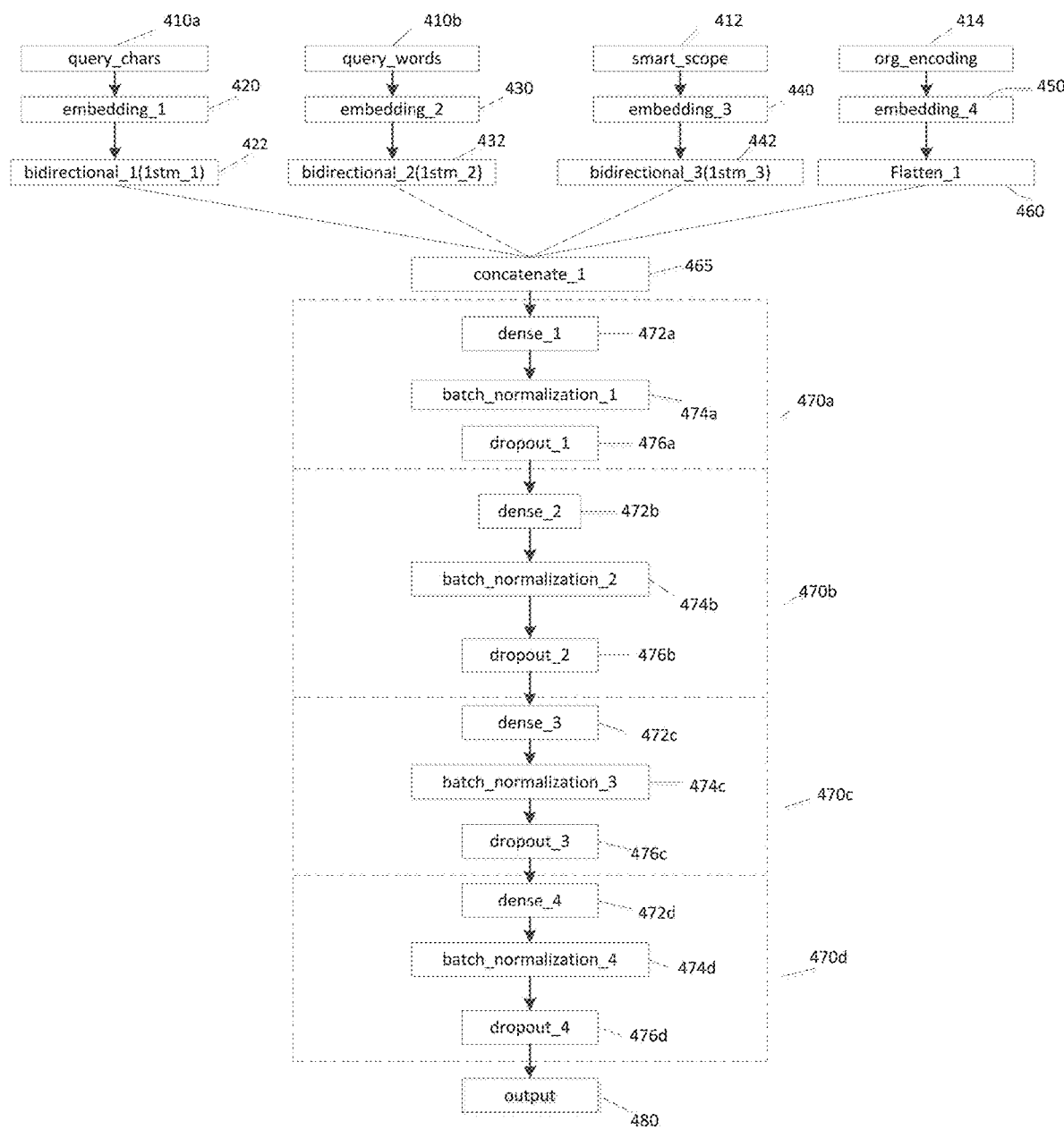
FIG. 4 is a simplified diagram illustrating the training of a neural network model for predicting entities for database query results according to some embodiments.

FIG. 4 is a simplified diagram illustrating the training of a neural network 400 according to some embodiments. In some embodiments, neural network 400 can be an implementation of the neural network 330 of computing device 300. And FIG. 5 shows a corresponding method 500 for training and use of the neural network 400 of FIG. 4.

One or more of the processes 510-540 of method 500 may be implemented, at least in part, in the form of executable code stored on non-transitory, tangible, machine-readable media that when run by one or more processors may cause the one or more processors to perform one or more of the processes 510-540. In some embodiments, method 500 can be performed by one or more computing devices in environment 110 of FIGS. 1 and 2.

In some embodiments, the model of neural network 400 is trained with tensorflow (keras) in python. The model of neural network 400 uses a deep learning to predict entities for results returned in response to a user search into a database system, such as system 116. In some embodiments, these include entities that may be standard for the database system (e.g., account, contact, lead, case, etc.) and provided for all organizations, as well as custom entities that are created by each organization for its own purposes.

Figure 5:
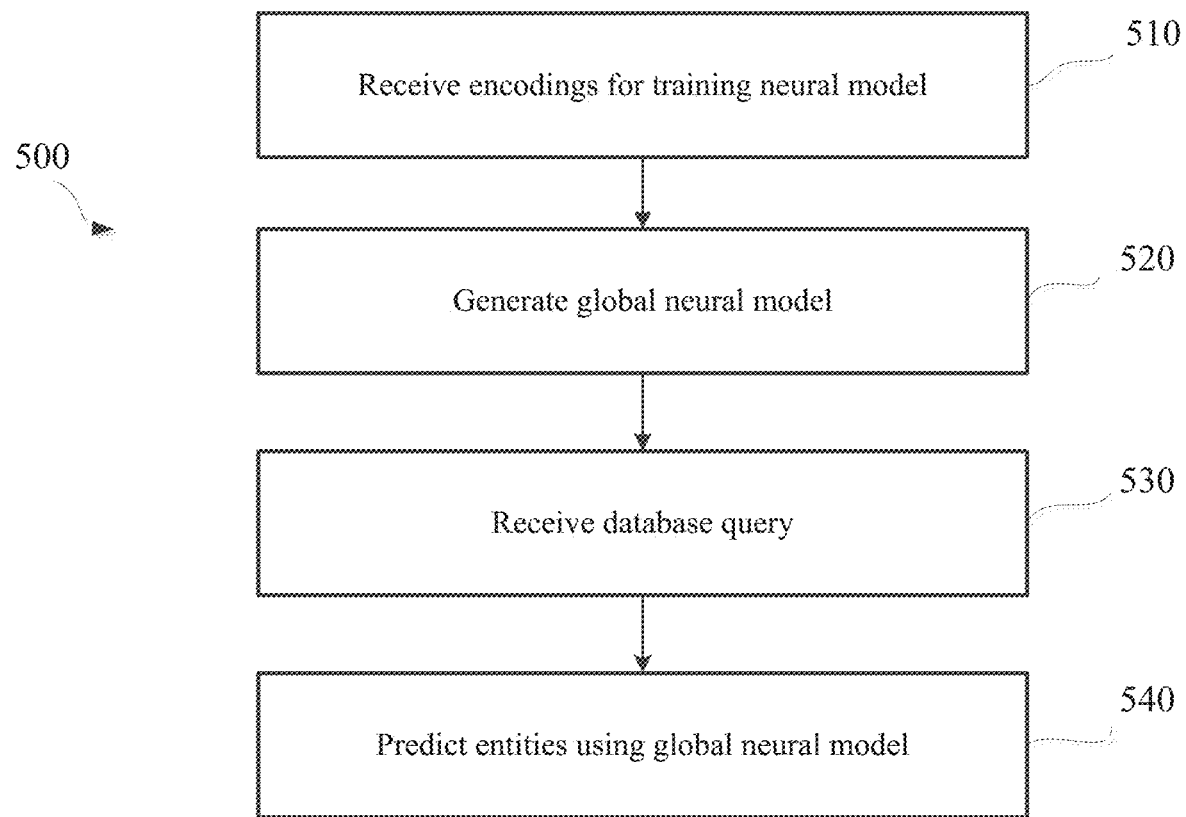
FIG. 5 is a simplified diagram of a method for training of a neural network model for predicting entities for database query results according to some embodiments.
Figure 6:
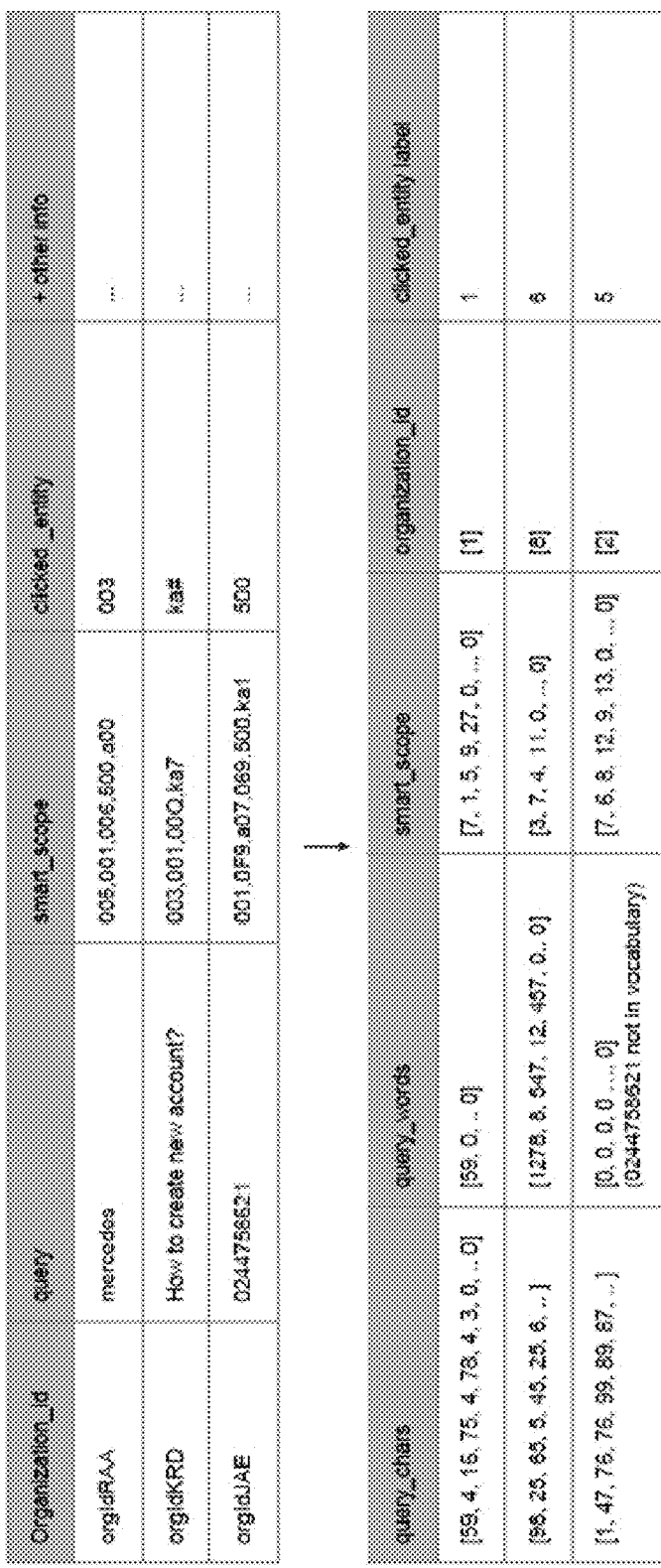
FIG. 6 is a simplified diagram illustrating the conversion of raw data into a dataset for training a neural network according to some embodiments.

To accomplish this, and with reference to FIGS. 4 and 5, the method 500 starts with a process 510. At process 510, the neural network 400 receives encodings for training the neural model so that it is able to predict the entities in which results are returned that are most relevant for a given search query. These encodings include encodings for one or more search queries 410, user frequency views (or "smart-scope") 412, and organizations 414. In some embodiments, the encodings are developed from a raw input dataset obtained from the app logs of search queries made into the database over a specific period of time, and processed into a dataset (e.g., in table form) for training the neural network 400. An example of this is illustrated in FIG. 6.

The search query encoding 410 relates to one or more queries (e.g., "mercedes"; "how to create a new account?"; "0244758621") previously made by organizations (e.g., orgIdRAA, orgIdKRD, orgIdJAE) into the database. Each search query can be parsed or deconstructed into its component characters (e.g., "m," "e," "r," "c," . . . ) and words (e.g., "mercedes"; "how," "to," "create," "a," . . . ), with respective encodings 410a and 410b for same provided to the neural network 400. In some embodiments, natural language processing (NLP) techniques can be applied for the search query encodings 410a and 410b.

The character encoding 410a comprises an array of indexes. For every search query, the encoding 410a encodes each character in the query up to 50 with the {character->index} mapping, with a 0 padding. For example, "Salesforce" could be encoded to [48, 2, 24, 4, 78, 41, 48, 11, 12, 4, 0, 0, 0, 0, . . . , 0] (array of size 50).

The neural network 400 converts the character encoding 410a using a character embedding layer 420. Character embedding layer 420 comprises an embedding matrix of vectors generated or based on the indexes from the character encoding 410a. To create the character embedding layer 420, the number of occurrences (nb_searches) of every character in queries every organization has done over the specific period of time are considered and ranked based on the count. A character vocabulary size is selected for the neural model (e.g., the top 10000 characters), mapping the remaining low-queried-volume characters to global default index value. (An example of this operation is illustrated in FIG. 7.) Thus, character embedding layer 420 can comprise an embedding matrix, which pulls the corresponding vectors from the matrix based on the indexes in the input array of the character encoding 410a. For example, the character embedding matrix will have a size of 128*10001=1280128, meaning each top 10000 character will be represented by a 128d vector, and all the low searched volume character will be represented by a single 128d vector. For one use-case, the values of the vectors are initialized randomly. The weights (values) of the embedding matrix are initialized at random and updated/learned using back-propagation at training time. The character level encoding 410a sent to the embedding layer 420 is then converted into a set of vectors based on the embedding matrix in layer 420 and passed to a bi-directional long-term short-term memory (biLSTM) 422.

Similarly, the word encoding 410b comprises an array of indexes. For every search, the word encoding 410a—after applying some processing to split words, lower case every character, etc.—encodes each word in the query up to 15 with the {word->index} mapping, with a 0 padding. For example, "use Salesforce" could be encoded to [154, 84, 0, 0, 0, 0, . . . , 0] (array of size 15).

The neural network 400 converts the word encoding 410b using a word embedding layer 430. Word embedding layer 430 comprises an embedding matrix of vectors generated or based on the indexes from the word encoding 410b. To create the word embedding 430a, the number of occurrences (nb_searches) of every word in queries every organization has done over the specific period a time and (after some preprocessing and word segmentation/tokenization, etc.) are considered and ranked based on the count. A word vocabulary size is selected for the neural model (e.g., the top 20000 words), mapping the remaining low-queried-volume words to a global default index value. (An example of this operation is illustrated in FIG. 8.) Thus, for example, word embedding layer 430 can comprise an embedding matrix of size 128*20001, which pulls the corresponding vectors from the matrix based on the indexes in the input array of the word encoding 410b. The weights (values) of the embedding matrix are initialized at random and updated/learned using back-propagation at training time. The word level encoding 410b sent to the embedding layer 430 is then converted into a set of vectors based on the embedding matrix in layer 430 and passed to a biLSTM 432. The vector forms or integers for the character and word encodings are used as features for the neural model.

The frequency view encoding 412 relates to the frequency of views (or "smart-scope") by one or more users, in the same or different organizations, into the various entities (e.g., account, contact, lead, case, etc.). According to some embodiments, for each user of the database, the user entity view frequency may comprise or incorporate a list of entities ranked according to frequency that such user accesses or views information from each entity. These entities can include entities that are standard for the database (e.g., account, contact, etc.) as well as custom entities set up by users or organizations. In some embodiments, each entity may be associated with or assigned a respective keyPrefix. For example, the account entity is associated with keyPrefix "001," the contact entity is associated with keyPrefix "003," the lead entity is associated with keyPrefix "005," and various custom entities can be associated with keyPrefixes "aPZ," "m00," etc. As such, the smart-scope can be an ordered list of keyPrefixes (e.g., [005,001,006,500,aPZ]).

The frequency view encoding 412 comprises an array of indexes. For every search, the encoding 412 encodes each user smartscope up to 20 with the {key prefix->index} mapping, with a 0 padding. For example, "005, 001, 006, 500, a00" could be encoded to [7, 1, 5, 9, 27, 0, . . . , 0] (array of size 20).

The neural network 400 converts the frequency view encoding 412 using a frequency view (keyPrefix) embedding layer 440. The frequency view embedding layer 440 comprises an embedding matrix of vectors generated or based on the indexes from the frequency view encoding 412. To create the frequency view embedding layer 440, the number of occurrences (nb_searches) of every keyPrefix in every smart-scope for every query over the specified period of time are considered and ranked based on the count. A keyPrefix vocabulary size is selected for the neural model (e.g., top 1244 keyPrefixes, each occurring at least 200 times overall), mapping the remaining low-presence keyPrefix in the smartscope to a global default index value. (An example of this operation is illustrated in FIG. 9.) Thus, for example, frequency view embedding layer 440 can comprise an embedding matrix of size 32*1245, which pulls the corresponding vectors from the matrix based on the indexes in the input array of the frequency view encoding 412. The weights (values) of the embedding matrix are initialized at random and updated/learned using back-propagation at training time. The frequency view encoding 412 sent to the embedding layer 440 is then converted to a set of vectors based on the embedding matrix in layer 440 and passed to a biLSTM 442.

The organization encoding 414, also referred to as an organization identification (ID) encoding (orgId), relates to many, up to all, of the organizations whose users access or make search queries into the multi-tenant database. In some embodiments, for each search query (e.g., "mercedes") made over a specified period of time, the underlying information for organization encoding 414 includes information for the identity of the organizations (organization_id) whose users made the particular search query, and the number of times (nb_searches) that the particular query was made by that organization's users.

The organization encoding 414 comprises an array of indexes. For every query, organization encoding 414—after apply some processing to split words, lower case every character, etc.—encodes each organization_id up to 1 with the {organization_id->index} mapping. For example: "orgIdRAA" could be encoded to [1] (array of size 1). As another example, "unknown" could be encoded to [0] (array of size 1).

In some embodiments, the organization encoding 414 includes or takes the form of a list of keyPrefixes of the entities most relevant to the organization (orgId→List[keyPrefix]). This implies creating a {orgId int} mapping that will be used to encode the organization_id. For a given organization, the organization encoding 414 maps the entities which the neural model will include or are most relevant in a prediction for a search result made by users of that organization. Examples of mappings for various organizations (e.g., indicated by "orgIdRAA," "orgIdKRD," and "orgIdJAE") are provided below:

orgIdRAA→[001, a0A, 003]
orgIdKRD→{aJS, ka #, 006, 003, 069, 005, 00Q, 001, 500, . . . }
orgIdJAE→{00U, 006, 003, 00Q, 001}

The neural network 400 converts the organization encoding 414 using an organization embedding layer 450. The organization embedding layer 450 comprises an embedding matrix of vectors generated or based on the indexes from the organization encoding 414. To create the organization embedding layer 450, the number of queries every organization has done over a period a time are considered and ranked based on the count. In some embodiments, only the largest organizations (as determined by respective number of searches and/or users) are included in the embedding; the embedding drops or omits smaller organizations. For example, in some embodiments, organization specificities for the top 6000 organizations are captured, mapping other low-query-volume to a global default organizationId value. (An example of this operation is illustrated in FIG. 10.) Thus, for example, organization embedding layer 450 can comprise an embedding matrix of size 128*6001, which pulls the corresponding vectors from the matrix based on the indexes in the input array of the organization encoding 414. The weights (values) of the embedding matrix are initialized at random and updated/learned using back-propagation at training time.

According to some embodiments, the organization embedding 450 may be learned end-to-end while training the neural network model 400 (with other features) on its classification task. The training will result in having one vector per organization and cluster the organizations based on their search characteristics (reflecting their different click distributions and search patterns). For instance, two organizations having similar search usage will end up having similar vector cosines, closer than distant organizations. The organization encoding 414 sent to the organization embedding layer 450 is then converted to a set of vectors based on the embedding matrix in layer 450 and flattened 460.

The features or vectors output from biLSTM 422 (derived from the character level encoding 410*a*), biLSTM 432 (derived from the character level encoding 410*b*), biLSTM 442 (derived from the user frequency views encoding 412), and flattener 460 (derived from the organization encoding 414) are concatenated by a concatenator 465.

At a process 520, the model of neural network 400 is trained using the concatenated features or vectors. For training, neural network 400 may include or be implemented with a multi-layer or deep neural network or neural model, having one or more layers 470*a*, 470*b*, 470*c*, 470*d*. According to some embodiments, examples of multi-layer neural networks include the ResNet-32, DenseNet, PyramidNet, SENet, AWD-LSTM, AWD-QRNN and/or the like neural networks. The ResNet-32 neural network is described in further detail in He, et al., "Deep Residual Learning for Image Recognition," arXiv:1512.03385, submitted on Dec. 10, 2015; the DenseNet neural network is described in further detail in landola, et al., "Densenet: Implementing Efficient Convnet Descriptor Pyramids," arXiv:1404.1869, submitted Apr. 7, 2014, the PyramidNet neural network is described in further detail in Han, et al., "Deep Pyramidal Residual Networks," arXiv:1610.02915, submitted Oct. 10, 2016; the SENet neural network is described in further detail in Hu, et al., "Squeeze-and-Excitation Networks," arXiv: 1709.01507, Sep. 5, 2017; the AWD-LSTM neural network is described in further detail in Bradbury, et al., "Quasi-Recurrent Neural Networks," arXiv:1611.01576, submitted on Nov. 5, 2016; each of which are incorporated by reference herein.

Each neural network layer 470 can operate or process the features or vectors, performing, for example, regularization (e.g., L2 and L1 regularization, Early stopping, etc.), normalization, and activation. As shown, in some embodiments, each neural network layer 470*a*, 470*b*, 470*c*, 470*d* includes a dense 472*a*, 472*b*, 472*d*, 472*d*, a batch normalization 474*a*, 474*b*, 472*c*, 474*d*, and a dropout 476*a*, 476*b*, 476*d*, 476*d* for deep learning. In some embodiments, a respective rectifier linear unit (ReLU) at the end of each layer 470*a*, 470*b*, 470*c*, 470*d* performs a ReLU activation function.

An output layer 480 of the neural network 400 performs a softmax function to produce or generate one single model (for all organizations) for all entities, including standard entities (e.g., 001 (account), 003 (contact), 005 (lead), etc.) as well as custom entities (e.g., custom0, custom1, etc.). The global model predicts entities for present queries into a database system, such as system 116. In some embodiments, the model comprises or represents a probability distribution for each entity (whether standard or custom) with respect to a given search query. For the distribution, each entity has a corresponding numerical value representing or indicative of the relevance of that such entity to the present search query. The total of all values in the probability distribution add up to one.

After training, the global model of neural network 400 is used for prediction of entities responsive to a query presently made by any user of the database system, such as system 116. In some embodiments, at query time, the model is loaded as a tensorflow model in java. At a process 530, the neural network 400 may receive a user query. In some embodiments, the present user query could be input by a user in a search bar or similar user interface tool on a respective user system 112 (see FIG. 1), which could be a handheld computing device, a mobile phone, a laptop computer, a notepad computer, a work station, and/or a network of computing devices. The user query could, for example, be one that includes the term "Johnson," and within the database, the term "Johnson" could appear in 1 of 100 account records, 5 of 1,000 contact records, and 12 of 2,000 lead records.

At a process 540, the neural network model 400 responds to the user's present query into the database system by predicting the entities (such as an account, a contact, a lead, an opportunity, a group, a knowledge article, etc.) the user intends to search. The neural network 400 outputs a query result based on the prediction. Continuing with the example given above, the database system can output the 1 account record that includes the term "Johnson" as the first listed result, output the 12 lead records that include the term "Johnson" as the next listed results, and output the 5 contact records that include the term "Johnson" as the last listed results, based upon, among other things, the query itself (characters and words), the entity view frequency of the various users into the database, and view history of various organizations accessing the database. This provides a better and more optimal user experience for the search function into the database.

In some embodiments, the neural network model can be further trained or combined with a statistical or heuristic model to address outlier users and rarely clicked entities in the environment of the multi-tenant system 116. In particular, some users of the system 116 may have click patterns that are very different from other system users. For example, imagine an organization with two users. The first user interacts frequently with the system 116—e.g., making 1000 queries a day in the account entity [001] and the contact entity [003]. The second user interacts with the system 116 far less frequently—e.g., making two queries a day, but almost always in the case entity [500].

Without more, considering the entity mapping of {001, 003, 500}, the global machine learning model, which learns from users with more search queries, might wrongly tend to rank the case entity [500] last for the second user, because the first user has far more clicks for the account [001] and contact [003] entities. Thus, the second user, who might be considered an "outlier" user because of her/his low query volume, could have a degraded or less than optimal experience as the model will not present that user with search results that are prioritized for the entity or entities that are most relevant to her/him. To address this, a statistical or heuristic model is combined or incorporated with the global predictive model to create a hybrid model. The statistical/heuristic model, which can be referred to as a user's smart scope, looks at or considers each user's particular interactions with the system, creating a scope of entities based on that user's interactions to system objects (clicks, views, etc.).

The hybrid model, comprising the global predictive model and the statistical/heuristic model, returns predictions (reordered list of entities) to the user, taking into account or considering the entities in the user's smart-scope. If the entities to reorder are not in the global predictive mapping, the hybrid model leaves them at the same position of the user's smart-scope and reorders the rest of the entities among them themselves. Returning to the example, the hybrid model prioritizes the case entity [500] so that the second user will have search results from [500] first, and reorders search results for the other entities [001, 003] based on the machine learning model. As such, the hybrid model does not penalize "outlier" users in the sense that if a single user interacts only with the same entity that is not in the organization's mapping (entity clicked less than X % of time overall but almost 100% of the time for this user), this entity will still be displayed at the top for this user.

As discussed above and further emphasized here, FIGS. 4 and 5 are merely examples of a neural network 400 and corresponding method 500 which should not unduly limit the scope of the claims. One of ordinary skill in the art would recognize many variations, alternatives, and modifications.

Some examples of computing devices, such as computing device 300, may include non-transitory, tangible, machine readable media that include executable code that when run by one or more processors (e.g., processor 310) may cause the one or more processors to perform the processes of method 500. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. For a database accessible by a plurality of separate organizations, a system for predicting entities for database query results, the system comprising:
   an interface that receives one or more previous search queries made into the database;

a memory storing a plurality of processor-executable instructions for predicting one or more database query results in response to the search query; and one or more processors executing the plurality of processor-executable instructions to:
- generate, at a character level or a word level, a query encoding based at least in part on the one or more previous queries made by one or more organizations into the database,
- generate a user entity view frequency encoding for a particular entity based at least in part on a frequency of views of the particular entity by one or more users,
- generate an organization encoding based at least in part on identities of the one or more organizations who made the one or more previous queries accessing the database,
- concatenate feature representations of the query encoding, user entity view frequency encoding and the organization encoding; and
- based on using the concatenated feature representations of the query encoding, the user entity view frequency encoding, and the organization encoding as training inputs, train a neural model for predicting entities for results to a search query into the database.

2. The system of claim 1, wherein the neural model is global across the one or more organizations accessing the database.

3. The system of claim 1, wherein the organization encoding comprises a mapping of one of the one or more organizations accessing the database to the entities most relevant to that organization, and comprises encoding of a number of times that the one organization made queries accessing the database.

4. The system of claim 1, wherein the one or more processors execute the plurality of processor-executable instructions further to generate a list of predicted entities for results in response to a present query into the database after training, wherein the list of predicted entities include both entities that are standard and custom to the database.

5. The system of claim 1, wherein the one or more processors execute the plurality of processor-executable instructions further to implement a heuristic model for predicting the entities for results to a present query into the database based on a user's particular interactions with the database.

6. The system of claim 1, wherein the neural model is loaded at a time when a present query is made into the database.

7. The system of claim 1, wherein the query encoding comprises at least one of a character encoding and a word encoding, either of which is encoded by a character or word to index mapping.

8. The system of claim 1, wherein a respective embedding is used to convert any of the query encoding, the user entity view frequency encoding, and the organization encoding into a vector form of feature representation.

9. For a database accessible by a plurality of separate organizations, a method for predicting entities for database query results, the method performed by one or more processors executing machine executable code, the method comprising:
- generating, at a character level or a word level, a query encoding based at least in part on the one or more previous queries made by one or more organizations into the database;
- generating a user entity view frequency encoding for a particular entity based at least in part on a frequency of views of the particular entity by one or more users;
- generating an organization encoding based at least in part on identities of the one or more separate organizations who made the one or more previous queries accessing the database;
- concatenating feature representations of the query encoding, user entity view frequency encoding and the organization encoding; and
- using the concatenated feature representations of the query encoding, the user entity view frequency encoding, and the organization encoding as training inputs, training a neural model for predicting entities for results to a search query into the database.

10. The method of claim 9, wherein the neural model is global across the one or more organizations accessing the database.

11. The method of claim 9, wherein the organization encoding comprises a mapping of one of the one or more organizations accessing the database to the entities most relevant to that organization, and comprises encoding of a number of times that the one organization made queries accessing the database.

12. The method of claim 9, further comprising: generate a list of predicted entities for results in response to a present query into the database after training, wherein the list of predicted entities include both entities that are standard and custom to the database.

13. The method of claim 9, further comprising implementing a heuristic model for predicting the entities for results to the present query into the database based on a user's particular interactions with the database.

14. The method of claim 9, wherein the neural model is loaded at a time when a present query is made into the database.

15. The method of claim 9, wherein the query encoding comprises at least one of a character encoding and a word encoding, either of which is encoded by a character or word to index mapping.

16. The method of claim 9, further comprising converting each of the query encoding, the user entity view frequency encoding, and the organization encoding into a vector form of feature representation using a respective embedding.

17. For a database accessible by a plurality of separate organizations, a non-transitory machine readable medium having stored thereon instructions for performing a method comprising machine executable code which when executed by at least one machine, causes the machine to:
- generate, at a character level or a word level, a query encoding based at least in part on the one or more previous queries made by one or more organizations into the database;
- generate a user entity view frequency encoding for a particular entity based at least in part on a frequency of views of the particular entity by one or more users;
- generate an organization encoding based at least in part on identities of the one or more organizations who made the one or more previous queries accessing the database;
- concatenate feature representations of the query encoding, user entity view frequency encoding and the organization encoding; and
- using the concatenated feature representations of the query encoding, the user entity view frequency encoding, and the organization encoding as training inputs, train a neural model for predicting entities for results to a search query into the database.

18. The non-transitory machine readable medium of claim 17, wherein the neural model is global across the one or more organizations accessing the database.

19. The non-transitory machine readable medium of claim 17, wherein the organization encoding comprises a mapping of one of the one or more organizations accessing the database to the entities most relevant to that organization, and comprises encoding of a number of times that the one organization made queries accessing the database.

20. The non-transitory machine readable medium of claim 17, wherein the predicted entities for results include both entities that are standard and custom to the database.

21. The non-transitory machine readable medium of claim 17, further storing instructions which when executed by at least one machine, causes the machine to implement a heuristic model for predicting the entities for results to the present query into the database based on a user's particular interactions with the database.

22. The non-transitory machine readable medium of claim 17, wherein the neural model is loaded at a time when a present query is made into the database.

23. The non-transitory machine readable medium of claim 17, wherein the query encoding comprises at least one of a character encoding and a word encoding, either of which is encoded by a character or word to index mapping.

24. The non-transitory machine readable medium of claim 17 storing instructions which when executed by at least one machine, causes the machine to convert each of the query encoding, the user entity view frequency encoding, and the organization encoding into a vector form of feature representation using a respective embedding.

* * * * *